July 23, 1935.     B. R. BENJAMIN     2,008,742
CULTIVATOR
Filed June 6, 1934
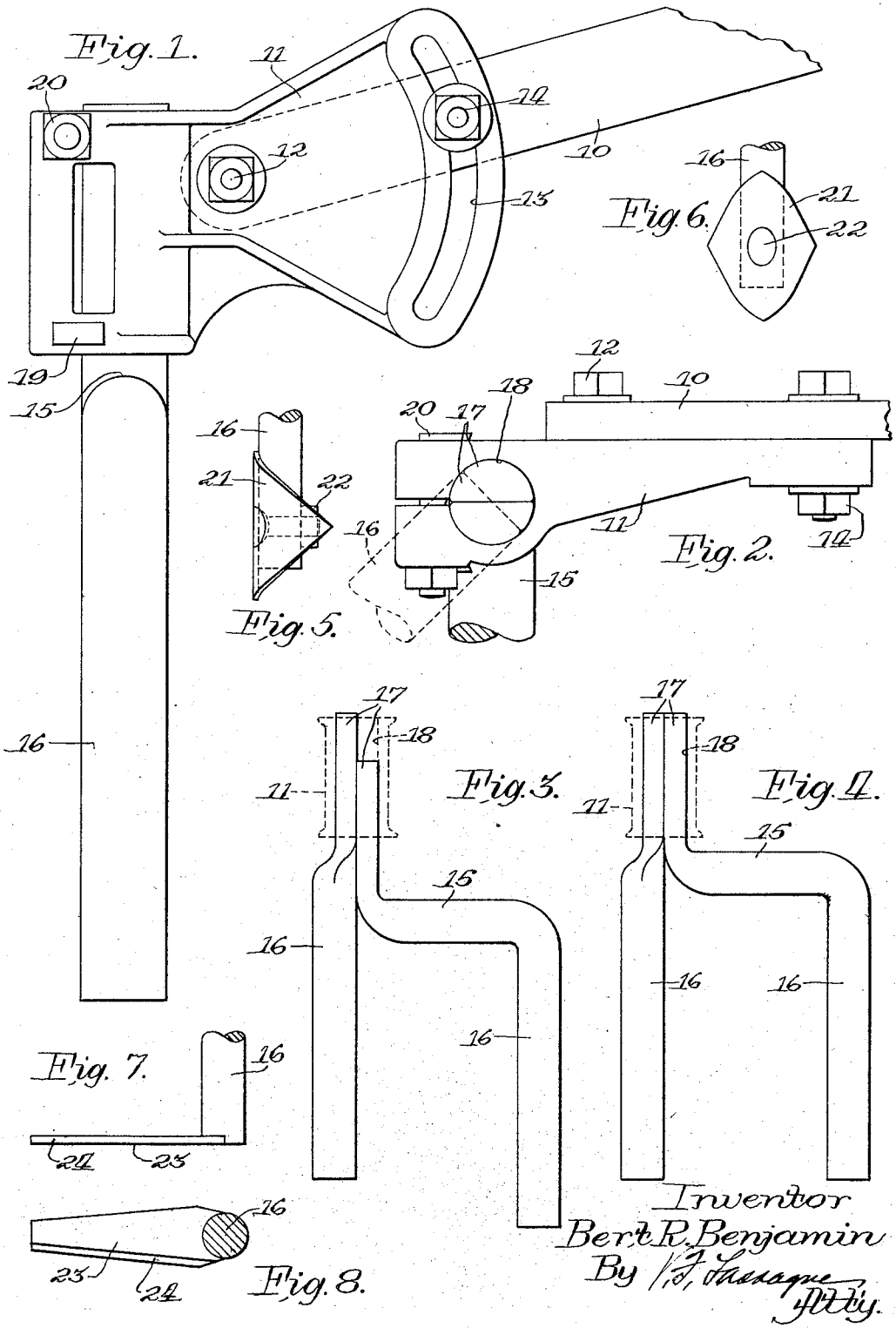

Patented July 23, 1935

2,008,742

UNITED STATES PATENT OFFICE 2,008,742

CULTIVATOR

Bert R. Benjamin, Oak Park, Ill., assignor to International Harvester Company, a corporation of New Jersey Application June 6, 1934, Serial No. 729,188

10 Claims. (Cl. 97—198.1)

This invention relates to a cultivator for field crops. More specifically it relates to improved cultivating elements and to an improvement in means for attaching the elements to the beams of a cultivator.

The principal object of the invention is to provide a simple, efficient cultivating element of the type particularly adapted for breaking encrusted soil and for surface cultivation of finely worked seed beds. Another object is to provide an attaching means for cultivating elements on cultivator beams, which provides for all of the necessary and desired adjustments. These objects and others which will be apparent are accomplished by a construction such as shown in the attached drawing, in which:

Figure 1 is an elevation showing the rear end of a cultivator beam and an attaching means, and cultivator elements embodying the invention;

Figure 2 is a plan view of the structure shown in Figure 1, the offset element being broken away, and the dotted line position showing adjustment about a vertical axis to vary lateral spacing of the elements;

Figures 3 and 4 are rear elevations with the attaching clamp shown in dotted lines to better illustrate the independent vertical adjustment of the cultivating elements;

Figure 5 is a side elevation showing a modified cultivating element in which a small curved plate is used in the nature of a shovel;

Figure 6 shows a front view of the same structure shown in Figure 5;

Figure 7 is a side elevation showing another modified form of cultivating element; and, Figure 8 is a horizontal section looking downwardly of the same structure shown in Figure 7.

The cultivating elements and the attaching clamp therefor incorporated in this invention may be utilized on any type of cultivator for row crop use, or for cultivation of open fields. Only the beam 10 of a cultivator has been illustrated. It may be adjustably supported by any conventional means on the cultivating implement. An attaching member 11 is pivotally mounted at the rear end of the cultivator beam 10 by a bolt 12 extending through the cultivating beam and through the member. To provide for adjustment about the transverse axis of the bolt 12, the forwardly extending portion of the member 11 is formed with a slot 13 concentric with the axis of the bolt 12. A clamp bolt 14 extending through the slot and through the beam 10 forms a means for securing the attaching member 11 to the shank 10 in any angular position within the range provided for by the slot 13.

The cultivating elements may include an offset form 15 or may be a combination of the offset form and the straight form 16. The ground engaging portions of the cultivating elements 15 and 16 are preferably circular in cross section, as it has been found that this shape is very efficient to stir up the soil, break the crust, and destroy the small weeds which have taken root. At their upper ends the cultivating elements 15 and 16 are formed with extensions 17 semi-circular in cross section. The flattened faces are so formed that a straight element and an offset element, or two offset elements may be assembled with the extensions forming together an extension circular in cross section. These complemental extensions are fitted into a vertical, cylindrical bore 18 formed in the clamping member 11 and rigidly secured with respect to the clamping member by the clamping bolts 19 and 20.

With the elements arranged as shown in Figures 3 and 4 with the ground engaging ends in transverse alignment, the spacing is determined by the amount of offset in the element 15 or the sum of the offsets when both elements are so shaped. To provide for narrower spacing with the use of the same elements, the extensions 17 may be rotated in the bore 18, bringing the ground engaging ends out of transverse alignment and narrowing the space between the two when moved in the line of draft of the cultivator. This is a particularly important feature of the invention, as adjustment is frequently necessary to take care of different widths of spacings of rows and to bring the cultivating elements nearer to or farther away from a row of plants.

There is also another important adjustment inherent in the present design of cultivating elements. To accommodate side hill work, or to cultivate at a lower depth in the center of the row away from the plants, one of the cultivating elements may be adjusted vertically with respect to the other, as shown in Figure 3. This adjustment is readily obtained by loosening the bolts 19 and 20.

Although it has been found that the best results are usually obtained by maintaining the cultivating elements substantially vertical, the slot 13 on the clamping member provides means for tilting the cultivating elements forwardly or rearwardly. This adjusting means also provides for properly locating the elements on different cultivating implements or, when there is a variation, such for example as in the angular position of the tongue of horse drawn implements.

The shovel type modification shown in Figures 5 and 6 may be utilized when a wider engaging front is required for conditions where the rod-like element does not satisfactorily perform the desired operation. The shovels 21, which, as shown, are formed of substantially square pieces of material fitted around the cultivating element 16, are secured by bolts 22.

In the form shown in Figures 7 and 8, a knife element 23 is connected to the lower end of the element 16 as, for example, by welding and lies in a substantially horizontal plane. Said element is provided with a cutting edge 24. The particular angular direction of the knife 23 depends upon the type of work to be done. This type of cultivating element is particularly adapted for surface work in destroying weeds which have become deeply rooted.

Although applicant has shown and described only certain preferred embodiments of his invention, it is to be understood that he claims all modifications falling within the scope of the appended claims.

What is claimed is:

1. In a cultivating attachment having a standard support, and in combination therewith, a substantially vertical bore formed in said support, and cultivating elements having upper end portions fitted together into said bore and rigidly secured therein.

2. In a cultivating attachment having a standard support, and in combination therewith, a substantially vertical bore formed in said support, and cultivating elements having complemental upper end portions shaped to form together a substantially cylindrical upper end, said end portions being fitted together into said bore and rigidly secured together.

3. In a cultivating attachment having a beam and in combination therewith, a standard support adjustably mounted on said beam on a transverse axis, a substantially vertical bore formed in said support, and cultivating elements having complemental upper end portions fitted together into said bore and rigidly secured therein.

4. In a cultivating attachment having a standard support and in combination therewith, a substantially vertical bore formed in said support, and cultivating elements each having an upper end portion semi-circular in cross section, said end portions being fitted together into said bore and rigidly secured therein.

5. In a cultivating attachment having a beam and in combination therewith, a standard support adjustably mounted on said beam on a transverse axis, a substantially vertical bore formed in said support, and cultivating elements each having an upper end portion semi-circular in cross section, said end portions being fitted together into said bore and rigidly secured therein.

6. A cultivating implement comprising a beam having an attaching member for carrying cultivating elements, a substantially vertical bore formed in said attaching member, a rod-like cultivating element, a second rod-like cultivating element having an offset end portion and a substantially vertical extension therefrom, and means for clamping the upper end portions in the bore formed in the attaching member.

7. A cultivating implement comprising a beam having an attaching member for carrying cultivating elements, a substantially vertical bore formed in said attaching member, a rod-like cultivating element, a second rod-like cultivating element having an offset end portion and a substantially vertical extension therefrom, and means for clamping the upper end portions in the bore formed in the attaching member, the securing means permitting rotation within the bore to adjust lateral spacing of the cultivating elements.

8. A cultivating implement comprising a beam having an attaching member for carrying cultivating elements, a substantially vertical bore formed in said attaching member, a rod-like cultivating element, a second rod-like cultivating element having an offset end portion and a substantially vertical extension therefrom, and means for clamping the upper end portions in the bore formed in the attaching member, the securing means being formed to permit rotation within the bore to adjust lateral spacing of the cultivating elements and sliding movement of one element relative to the other to regulate the depth of penetration.

9. A cultivating implement comprising a support for carrying cultivating elements, a substantially vertical bore formed in said support, a rod-like cultivating element formed semi-circular in cross section at its upper end, a second rod-like cultivating element having an offset end portion and a substantially vertical extension therefrom formed semi-circular in cross section, and means for clamping the upper end portions in the bore formed in the support.

10. A cultivating implement comprising a support for carrying cultivating elements, a substantially vertical bore formed in said support, a rod-like cultivating element formed semi-circular in cross section at its upper end, a second rod-like cultivating element having an offset end portion and a substantially vertical extension therefrom formed semi-circular in cross section, and means for clamping the upper end portions of said elements in the bore formed in the support, the securing means permitting rotation within the bore to adjust lateral spacing of the cultivating elements and sliding movement of one element relative to the other to regulate the depth of penetration.

BERT R. BENJAMIN.